US006989978B2

(12) United States Patent
Hiraku et al.

(10) Patent No.: US 6,989,978 B2
(45) Date of Patent: Jan. 24, 2006

(54) POWER CIRCUIT DEVICE FOR VEHICLES AND CONTROL METHOD THEREOF

(75) Inventors: Keizo Hiraku, Susono (JP); Hideki Suzuki, Chita-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 424 days.

(21) Appl. No.: 10/283,231

(22) Filed: Oct. 30, 2002

(65) Prior Publication Data

US 2003/0090847 A1 May 15, 2003

(30) Foreign Application Priority Data

Nov. 13, 2001 (JP) ............................ 2001-347178

(51) Int. Cl.
*H02H 3/18* (2006.01)

(52) U.S. Cl. ........................................................ 361/86

(58) Field of Classification Search .................. 361/86
See application file for complete search history.

(56) References Cited

U.S. PATENT DOCUMENTS 5,155,374 A * 10/1992 Shirata et al. ............ 290/38 R
5,455,463 A * 10/1995 Langnickel et al. ....... 307/10.1
5,515,233 A * 5/1996 Hofmann .................... 361/160
5,642,696 A * 7/1997 Matsui .................... 123/179.1
5,746,053 A * 5/1998 Hibino ........................ 60/277
5,831,803 A * 11/1998 Wynn et al. ................... 361/7
6,072,295 A * 6/2000 Kusunoki ................... 318/444
6,325,035 B1 * 12/2001 Codina et al. ........... 123/179.1
6,624,604 B2 * 9/2003 Torikoshi et al. ........... 318/443
6,718,927 B2 * 4/2004 Goetze et al. ........... 123/179.3

FOREIGN PATENT DOCUMENTS

DE 42 05 285 A1 8/1993
DE 42 41 056 A1 6/1994
DE 696 09 803 T2 2/2001
JP A 8-326527 12/1996

* cited by examiner

*Primary Examiner*—Stephen W. Jackson
*Assistant Examiner*—James A. Demakis
(74) *Attorney, Agent, or Firm*—Oliff & Berridge, PLC

(57) ABSTRACT

The power circuit device for vehicles is provided with a grounding portion for grounding portions closer to a power consumption device side than a relay of main conductive routes when the relays used for the main conductive routes extending from an accumulator of a vehicle to a fuel heating device, a catalyst heating device, an electric pump, or the like is turned OFF, so that a false power application is not executed even a short-circuit occurs in a part of a power circuit. Also, when two relays are arranged in series, the grounding portion is provided for the relay closer to the power consumption device in order to monitor a voltage level of the main conductive route and make it easy to detect a short-circuit or a disconnection occurrence.

18 Claims, 2 Drawing Sheets

POWER CIRCUIT DEVICE FOR VEHICLES AND CONTROL METHOD THEREOF

INCORPORATION BY REFERENCE

The disclosure of Japanese Patent Application No. 2001-347178 filed on Nov. 13, 2001 including the specification, drawings and abstract are incorporated herein by reference in their entirety.

BACKGROUND OF THE INVENTION

1. Field of the Invention

The invention relates to a power circuit device for vehicles for controlling a selective power supply to power consumption devices, such as a fuel heating device, a catalyst heating device, and an electric pump from an accumulator such as a battery, in a vehicle, and to a control method thereof.

2. Description of the Related Art

In vehicles such as an automobile, various power consumption devices are selectively activated by power supplied from an accumulator such as a battery. Examples of the power consumption devices are a fuel injector heater which heats a fuel, which is to be injected, at the time of a cold start of an internal combustion engine, a catalyst heater which heats a catalyst until an exhaust purifying catalyst warms up, an electric pump such as an oil pump or an air pump, or the like. In present vehicles, a power supply to the power consumption device from the accumulators is commonly executed by a power circuit device with a relay switched between ON (conductive state) and OFF (shut-off state) by a command signal from an electric vehicle operation control device with a computer.

Basically an operation of the power consumption device mounted in this type of vehicle can be controlled based on a control judgment of the electric vehicle operation control device. However, an operating environment of the power consumption device may vary beyond the judgement of the vehicle operation control device. Also, a malfunction may occur in each power consumption device, particularly in a heating device and its peripheral devices, due to heating. Due to a disturbance, a malfunction also may occur in an operation of the electric vehicle operation control device. In consideration of such a disturbance, Japanese Patent Laid-Open Publication No. 8-326527 discloses an insertion of another relay in series with the relay, which is ON-OFF controlled by the operation control device, into a power circuit of an electric heater, in a control of current application to the electric heater by an electric heating catalyst which is disposed in an exhaust passage of the internal combustion engine. It has been proposed that the other relay is separately ON-OFF controlled by detecting a current application condition of the electric heater.

When two relays are inserted in series in the middle of a main conductive route which passes a current to the power consumption device such as the electric heater of a catalyst from the accumulator, aside from ON-OFF conditions of each relay, a power supply of the power consumption device can be shut off also by turning OFF either of the relays when the power consumption device should not be activated, which ensures higher reliability in terms of security of the power consumption device.

However, even a short-circuit failure occurs in the power circuit including these relays due to a malfunction or welding, and either or both of the two relays are switched OFF, a possibility that the power consumption device is damaged due to being supplied with uncontrollable power by a power supply device cannot be entirely eliminated.

SUMMARY OF THE INVENTION

With respect to turning ON-OFF the power supply of the power consumption device in a vehicle, when the relay is turned OFF, a current may be falsely applied to the power consumption device due to a short-circuit failure occurrence, which is caused by welding, or the like in a part of the power circuit.

It is a primary object of the invention to prevent a false power application with higher reliability not only by shutting off a current supply to the power consumption device by turning OFF the relay but also by effectively using a switchover of the relay to OFF separately.

In addition, it is another object of the invention to achieve the following additional items by utilizing characteristics obtained from a relay double installation structure, when the power circuit device for vehicles includes the double installation structure of the relay. More specifically, the object is to make it possible not only to detect the above-mentioned occurrence of a short-circuit failure but also to detect other short-circuit failures or disconnection failures which may occur in such a power circuit for vehicles, when a failure occurs in a part of the power circuit or the power consumption device.

In order to solve the above-mentioned primary problem, a power circuit device for vehicles according to one aspect of the invention is a power circuit device for vehicles for controlling a selective power supply to the power consumption device from the accumulator. It is also provided with a main conductive route that includes relays switched between ON and OFF and passes a current to the power consumption device from the power supply device, and a grounding portion for grounding a portion in the main conductive route closer to the power consumption device than the relay when the relay is turned OFF.

DETAILED DESCRIPTION OF THE PREFERRED EMBODIMENT

Hereinafter, embodiments of the invention will be explained in detail, referring to the attached figures.

Figure 1:
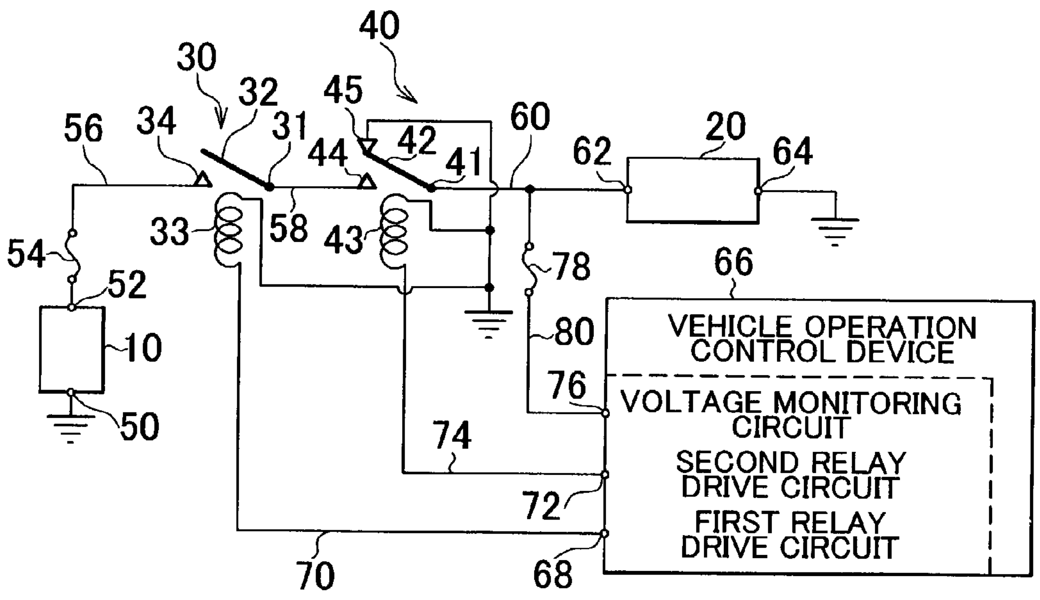
FIG. 1 is a schematic view showing an embodiment of a power circuit device for vehicles according to the invention.
Figure 2:
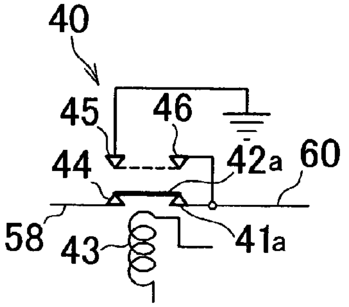
FIG. 2 is a schematic view showing a modification example with respect to a part of the power circuit device for vehicles shown in FIG. 1.

FIG. 1 is a schematic view showing a power circuit device for vehicles according to the invention, for selectively supplying a current from an accumulator 10 to a power consumption device 20 in a vehicle, as an embodiment. The power consumption device 20 is provided with a fuel injector heater, an exhaust catalyst heater, and an oil pump or an air pump.

According to the embodiment shown in the figure, a first armature 32, which moves up and down pivoting on a first relay output terminal 31, is drawn to a first coil 33 and brought to an open position abutting against an first relay input terminal 34, when a current is applied to the first coil 33. In a similar manner, a second armature 42, which moves up and down pivoting on a second relay output terminal 41 of the second relay 40, is drawn to a second coil 43 and brought to an open position abutting against a second relay input terminal 44, when a current is applied to the second coil 43.

This brings about an "ON" state where the first relay output terminal 31 and the first relay input terminal 34, and the second relay output terminal 41 and the second relay input terminal 44 are electrically connected respectively.

Meanwhile, as shown in the figure, when a current is not applied to the first coil 33 and the second coil 43, the first armature 32 and the second armature 42 are urged to the open positions which are away from the first relay input terminal 34 and the second relay input terminal 44 by a spring which is not shown in the figure. Then, an "OFF" state, where the first relay output terminal 31 and the first relay input terminal 34, and the second relay output terminal 41 and the second relay input terminal 44 are electrically insulated, is brought about.

Also, in the second relay 40, when the second armature 42 is brought to the open position, the second armature 42 abuts against a ground-side terminal 45.

A positive terminal 52 for the accumulator of the accumulator 10, which is grounded by a negative terminal 50 for the accumulator, is connected to the first relay input terminal 34 through a front half portion 56 of the main conductive route including an accumulator fuse 54. The first relay output terminal 31 is connected to the second relay input terminal 44 through a middle portion 58 of the main conductive route. The second relay output terminal 41 is connected to a positive terminal 62 for the power consumption device through an end half portion 60 of the main conductive route. A negative terminal 64 for the power consumption device is grounded.

The first coil 33 is excited with an exciting current, which is supplied from a first relay drive circuit embedded in an electric vehicle operation control device 66 with a built-in computer, through a first relay driving output terminal 68 and a first relay conductive route 70. In a similar manner, the second coil 43 is excited with an exciting current, which is supplied from a second relay drive circuit embedded in an electric vehicle operation control device 66, through a second relay driving output terminal 72 and a second relay conductive route 74. The other ends of the first coil 33 and the second coil 43 are grounded along with the ground-side terminal 45.

A voltage monitoring circuit is also embedded in the electric vehicle operation control device 66. An output terminal 76 for the voltage monitoring circuit, an output terminal of the electric vehicle operation control device, is connected to the end half portion 60 of the main conductive route, through a voltage monitoring conductive route 80 including a voltage monitoring circuit fuse 78.

The voltage monitoring circuit is means of applying a constant voltage of approximately 5 volts to the terminal 76 through a resistance element with an appropriate resistance as well as measuring a voltage level at the output terminal 76 for the voltage monitoring circuit.

The voltage monitoring circuit checks a grounding state of the end half portion 60 of the main conductive route, when a voltage from the accumulator 10 is not applied to the end half portion 60 of the main conductive route. Also, the voltage monitoring circuit detects an insulation or a ground short-circuit if it occurs in the end half portion 60 of the main conductive route or the power consumption device 20.

The voltage monitoring circuit also checks whether a voltage level at the end half portion 60 of the main conductive route is normal, when a voltage from the accumulator 10 is applied to the end half portion 60 f the main conductive route. Details of the operation will be explained later referring to FIG. 3.

Also, when the power consumption device 20 is a fuel heater for heating an injected fuel, it is usually provided for each cylinder of an internal combustion engine. Therefore, with respect to a multi-cylinder internal combustion engine, the circuit shown in FIG. 1 is provided to each cylinder except for the accumulator 10 and a main portion of the vehicle operation control device 66. In such a case, it is also acceptable to provide the relay 30 as a common relay to all the cylinders, and to provide each portion downstream of the relay 40 to each cylinder.

In an embodiment shown in FIG. 1, the second armature 42 moves up and down pivoting on the second relay output terminal 41. However, when the second relay 40 is turned OFF, it is acceptable that the second armature **42*a* is detached from both the second relay input terminal 44 and the second relay output terminal 41, which are on an ON side, and is abutted against the ground-side terminals 45 and 46 on OFF side, which is the opposite side of the terminals on the ON side. In this case, if the ground-side terminal 45 is grounded in a similar manner to FIG. 1, it is acceptable to connect the ground-side terminal 46 to the end half portion 60** of the main conductive route.

In either of the above-mentioned structures, when the second relay 40 is turned OFF, not only the end half portion 60 of the main conductive route, which is closer to the power consumption device 20 than the second relay 40, is insulated from the accumulator 10, but also the end half portion 60 of the main conductive route is grounded by the relay 40 which has been turned OFF. Therefore, even a short-circuit failure occurs in an indifferent route from the accumulator 10 to the end half portion 60 of the main conductive route, the power consumption device 20 can avoid being damaged by such a short-circuit current.

Figure 3:
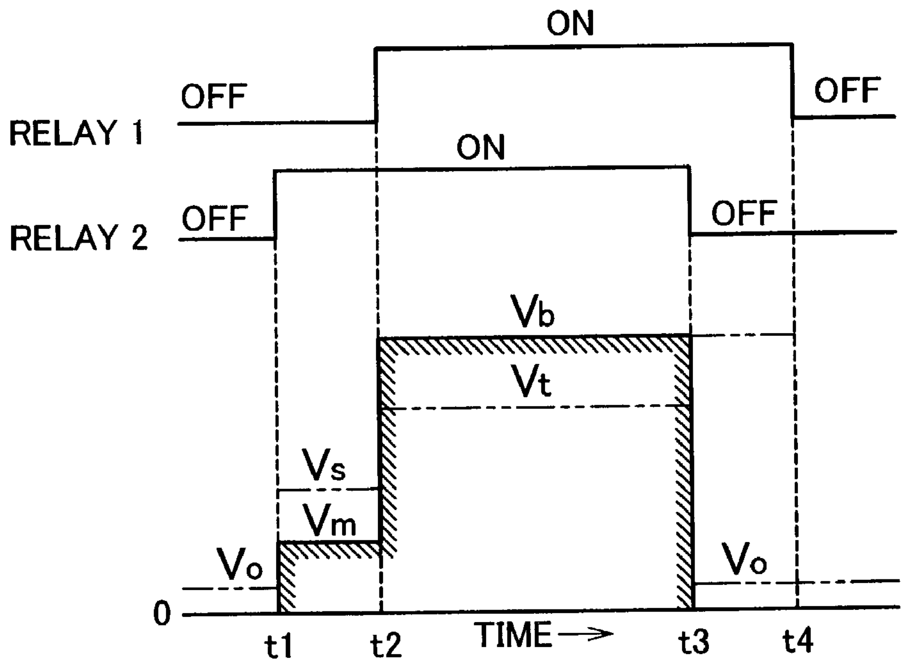
FIG. 3 is a diagram showing an example of failure detection procedures in an operation of the power circuit device for vehicles shown in FIG. 1

FIG. 3 is a diagram showing an embodiment of procedures to control the power circuit for vehicle, shown in FIG. 1, by the vehicle operation control device 66, selectively supply a current from the accumulator 10 to the power consumption device 20, and then detect whether the power circuit is properly operating using the voltage monitoring circuit.

First, when the power consumption device is not operating, that is, both the first relay 30 and the second relay 40 are in OFF state (shut-off state), the end half portion 60 of the main conductive route is grounded through the ground-side terminal 45 of the second relay 40. Therefore, a voltage level detected by the voltage monitoring circuit is supposed to be zero.

A threshold value for a voltage level, which is detected by the voltage monitoring circuit in a state where both the first relay 30 and the second relay 40 are in OFF state (or, at least when the second relay 40 is turned OFF), is set at an appropriate small positive value, such as zero.

Then, when the second relay is in OFF state and a disconnection or a current application failure (e.g. a contact failure between the second armature 42 and the ground-side terminal 45) occurs in the grounding circuit for grounding the power consumption device 20, the disconnection or the current application failure) can be detected based on the fact that the voltage level detected by the voltage monitoring circuit exceeds the threshold value V0.

Secondly, when the vehicle operation control device 66 determines that the power consumption device 20 should be newly activated, the second coil 43 is initially energized by the second relay drive circuit at the time of t1. When the second coil 43 is energized, the second armature 43 is drawn by the second coil 43 to be detached from the ground-side terminal 45 and be abutted against the second relay input terminal 44.

When the second armature is detached from the ground-side terminal 45, the grounding of the end half portion 60 of the main conductive route is reset, and a voltage applied from the voltage monitoring circuit to the end half portion 60 of the main conductive route is applied to the power consumption device 20. Also, when the circuit device and the power consumption device 20 are in normal state, a monitor voltage is a predetermined voltage level Vm in accordance with an amount of monitor current passing through the power consumption device 20. Therefore, if a voltage level detected by the voltage monitoring circuit is zero during time period when the first relay 30 is still in OFF state and only the second relay 40 is in ON state, it can be ascertained that a ground short-circuit (e.g. a welding of the second armature 42 to the ground-side terminal 45) has occurred in the end half portion 60 of the main conductive route.

Also, when the end half portion 60 of the main conductive route and the power consumption device 20 are in normal state, a current is passed through the power consumption device from the voltage monitoring circuit. Therefore, the above-mentioned voltage Vm must be lower than the above-mentioned constant voltage of approximately 5 volts, which the voltage monitor has. Then, during this period, an appropriate threshold value exceeding Vm, such as Vs, should be set for the voltage level detected by the voltage monitoring circuit. This makes it possible to ascertain that a disconnection has occurred somewhere in the route extending from the end half portion 60 of the main conductive route to grounding through the power consumption device, when the voltage monitoring circuit detects a voltage level higher than the threshold value. Also, as a matter of course, when a voltage level of the end half portion 60 of the main conductive route abnormally rises close to the voltage level of the power supply device during this period when the first relay 30 is still in OFF state, it can be ascertained that there is a short-circuit failure with respect to the first relay 30.

Next, the first relay 30 is turned ON (conduction state) at the time t2, which is with a time lag of, for example, approximately 100 ms after the time t1. This allows the accumulator 10 to execute a regular power supply to the power consumption device through the main conductive routes 56, 58, and 60, provided that the circuit device and the power consumption device 20 are properly operating. When both the first relay 30 and the second relay 40 are turned ON, a voltage level detected by the voltage monitoring circuit must be Vb, which is a rated output voltage level of the accumulator 10. Therefore, if a voltage level detected by the voltage monitoring circuit drastically drops below Vb, this means that a grounding short-circuit has occurred somewhere in the main conductive route. Such a grounding short-circuit can be detected by setting an appropriate predetermined threshold value Vt for a monitor voltage.

When an operation of the power consumption device should be stopped, the second relay 40 is initially turned OFF at the time t3. When the second relay 40 is turned OFF, a voltage level at the end half portion 60 of the main conductive route is supposed to drop to zero. If the monitor voltage level is equal to or higher than Vo at this time, it can be ascertained that a connection of a circuit for re-grounding the end half portion 60 of the main conductive route has not been properly established by turning OFF the second relay 40, which makes it possible to immediately detect an operation failure at the time of the grounding circuit recovery.

When an operation of the power consumption device is stopped, it is acceptable to turn OFF the first relay 30 and the second relay 40 simultaneously. However, the figure shows an example in which a time point t4 when the first relay 30 is turned OFF is delayed from the time point t3 for approximately 100 ms. As shown in the figure, if a time difference is set between time points on which these two relays are turned OFF, a failure can be detected by each of the voltage monitoring circuit when a failure occurs in ON-OFF operations of either of the relays. In this case, turning ON the second relay 40 prior to turning ON the first relay 30 at the time of an activation of the power consumption device provides remarkable effects as described above. Therefore, it is possible to expand a capability of individual check with respect to the ON-OFF operations of the relays by turning OFF the first relay 30 after the second relay 40, as shown in the example in the figure, so that an ON-OFF relation between the first relay 30 and second relay 40 at the time of an operation completion of the power consumption device becomes reverse of the relation at the time of activation of the power consumption device.

Up to this point, the invention has been explained in detail with respect to one embodiment. It may be apparent for those skilled in the art that not only the invention is limited to such an embodiment, but also various embodiments are available within a scope of the invention

What is claimed is:

1. A power circuit device for vehicles that controls a selective power supply to a power consumption device from an accumulator, the power circuit device comprising:

a main conductive route that includes at least one relay switched between ON and OFF, and passes a current from the accumulator to the power consumption device, the main conductive route including an end half portion that connects the power consumption device and the relay; and a grounding portion that grounds the end half portion when the relay is turned OFF, wherein:

the relay includes a first relay and a second relay connected in series between the accumulator and the power consumption device, and the ground portion grounds the end half portion in the main conductive route closer to the power consumption device than the second relay when the second relay is turned OFF.

2. The power circuit device for vehicles according to claim 1 further comprising:

a voltage monitoring portion that determines at least whether there is a short-circuit failure or a disconnection failure in the power circuit device for vehicles based on an ON-OFF states of the first relay and the second relay, and the voltage level of the end half portion of the main conductive route.

3. The power circuit device for vehicles according to claim 2 wherein:

the voltage monitoring portion determines that there is a disconnection failure in the grounding portion based on a fact that a voltage of the end half portion of the main conductive route is equal to or higher than a predetermined first threshold value, when the second relay is in OFF state, and a predetermined monitor voltage is applied to the end half portion of the main conductive route.

4. The power circuit device for vehicles according to claim 2 wherein:

the voltage monitoring portion determines that there is a grounding failure in the end half portion of the main conductive route based on a fact that a voltage of the end half portion of the main conductive route is substantially equal to zero, when the first relay is in OFF state and also the second relay is in ON state, and a predetermined monitor voltage is applied to the end half portion of the main conductive route.

5. The power circuit device for vehicles according to claim 2 wherein:

the voltage monitoring portion determines that there is a disconnection failure in at least either the end half portion of the main conductive route or the power consumption device based on a fact that a voltage of the end half portion of the main conductive route is equal to or higher than the predetermined second threshold value, when the first relay is in OFF state and also the second relay is in ON state, and a predetermined monitor voltage is applied to the end half portion of the main conductive route.

6. The power circuit device for vehicles according to claim 2 wherein:

the voltage monitoring portion determines that there is ground short-circuit in the main conductive route based on a fact that a voltage of the end half portion of the main conductive route is substantially lower than a voltage of the accumulator when the first relay and the second relay are in ON state.

7. The power circuit device for vehicles according to claim 1 wherein:

the first relay is turned ON from OFF after the second relay is turned ON from OFF, when a power supply from the accumulator to the power consumption device is started.

8. The power circuit device for vehicles according to claim 1 wherein:

the first relay is turned OFF from ON after the second relay is turned OFF from ON, when the power supply from the accumulator to the power consumption device is stopped.

9. A control method for a power circuit device for vehicles that controls a selective power supply from an accumulator to a power consumption device, the power circuit device comprising a main conductive route which includes at least one relay and passes a current from the accumulator to the power consumption device, the main conductive route including an end half portion that connects the power consumption device and the relay, the method comprising the step of:

grounding the end half portion when the relay is turned OFF, wherein the relay comprises a first relay and a second relay on the main conductive route in series between the accumulator and the power consumption device, the second relay being closer than the first relay to the power consumption device, and the grounding step grounds the end half portion between the second relay and the power consumption device, when the second relay is turned OFF.

10. The control method according to claim 9 further comprising the step of:

determining at least whether there is a short-circuit failure or a disconnection failure in the power circuit device for vehicles based on an ON-OFF states of the first relay and the second relay, and the voltage level of the end half portion of the main conductive route.

11. The control method according to claim 10 wherein:

the determining step determines that there is a disconnection failure between the second relay and the power consumption device based on a fact that a voltage between the second relay and the power consumption device is equal to or higher than the predetermined first threshold value, when the second relay is in OFF state, and a predetermined monitor voltage is applied to the route between the second relay and the power consumption device.

12. The control method according to claim 10 wherein:

the determining step determines that there is a ground short-circuit between the second relay and the power consumption device based on a fact that a voltage between the second relay and the power consumption device is substantially zero, when the first relay is in OFF state and the second relay is in ON state, and a predetermined voltage is applied between the second relay and the power consumption device.

13. The control method according to claim 10 wherein:

the determining step determines that there is a disconnection failure at least either between the second relay and the power consumption device or in the power consumption device based on a fact that a voltage between the second relay and the power consumption device is equal to or higher than a predetermined second threshold value, when the first relay is in OFF state and the second relay is in ON state, and a predetermined voltage is applied between the second relay and the power consumption device.

14. The control method according to claim 10 wherein:

the determining step determines that there is a ground short-circuit in the main conductive route based on a fact that a voltage between the second relay and the power consumption device is substantially lower than the voltage of the accumulator, when both the first relay and the second relay are in ON state.

15. The control method according to claim 9 further comprising the step of:

turning the first relay ON from OFF after turning the second relay ON from OFF, when a power supply from the accumulator to the power consumption device is started.

16. The control method according to claim 9 further comprising the step of:

turning the first relay OFF from ON after turning the second relay OFF from ON, when the power supply from the accumulator to the power consumption device is stopped.

17. A power circuit device for vehicles that controls a selective power supply to a power consumption device from an accumulator, the power circuit device comprising:

a main conductive route that includes at least one relay switched between ON and OFF, and passes a current from the accumulator to the power consumption device, the power consumption device being a heating device or an electric pump, the main conductive route including an end half portion that connects the power consumption device and the relay; and a grounding portion that grounds the end half portion when the relay is turned OFF.

18. A control method for a power circuit device for vehicles that controls a selective power supply from an accumulator to a power consumption device, the power circuit device comprising a main conductive route which includes at least one relay and passes a current from the accumulator to the power consumption device, the main conductive route including an end half portion that connects the power consumption device and the relay, the method comprising the step of:

grounding the end half portion when the relay is turned OFF, wherein the power consumption device is a heating device or an electric pump.

* * * * *